(12) United States Patent
Dahlheimer

(10) Patent No.: US 7,845,740 B2
(45) Date of Patent: Dec. 7, 2010

(54) UNITIZED SEAL WITH INTEGRAL SPACER

(75) Inventor: John C. Dahlheimer, Laconia, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 12/490,600

(22) Filed: Jun. 24, 2009

(65) Prior Publication Data

US 2009/0261650 A1 Oct. 22, 2009

Related U.S. Application Data

(62) Division of application No. 11/142,875, filed on Jun. 1, 2005, now abandoned.

(51) Int. Cl.
*B62D 55/088* (2006.01)
(52) U.S. Cl. ........................ 305/102; 305/105; 305/106; 277/361; 277/390
(58) Field of Classification Search ................. 305/100, 305/102–106; 277/361, 274, 375, 390–393
See application file for complete search history.

(56) References Cited

U.S. PATENT DOCUMENTS

| | | | |
|---|---|---|---|
| 3,231,284 A | | 1/1966 | Peickii et al. |
| 3,273,901 A | * | 9/1966 | Schmengler ................. 277/381 |
| 3,392,984 A | * | 7/1968 | Reinsma et al. ............. 277/380 |
| 3,975,028 A | * | 8/1976 | Satsumabayashi et al. .. 305/103 |
| 4,076,333 A | * | 2/1978 | Baylor ........................ 305/104 |
| 4,179,130 A | * | 12/1979 | Fass et al. .................... 277/384 |
| 4,185,838 A | * | 1/1980 | Danner ........................ 277/562 |
| 4,243,234 A | | 1/1981 | Blaha |
| 4,256,316 A | * | 3/1981 | Reinsma ...................... 277/384 |
| 4,311,346 A | * | 1/1982 | Danner ........................ 305/103 |
| 4,330,134 A | * | 5/1982 | Kolinger ..................... 277/363 |
| 4,337,628 A | | 7/1982 | Greene |
| 4,457,521 A | * | 7/1984 | Morley ........................ 305/103 |
| 4,548,547 A | | 10/1985 | Deuring |
| 5,094,466 A | | 3/1992 | Baker et al. |
| 5,763,956 A | * | 6/1998 | Metz et al. ................... 305/102 |
| 5,826,884 A | * | 10/1998 | Anderton et al. ............ 277/396 |
| 5,829,850 A | | 11/1998 | Ketting et al. |
| 5,853,233 A | | 12/1998 | Turner |
| 5,899,459 A | * | 5/1999 | Watts .......................... 277/380 |
| 6,062,815 A | | 5/2000 | Holt et al. |
| 6,105,969 A | * | 8/2000 | Anderton et al. ............ 277/405 |
| 6,142,588 A | | 11/2000 | Ketting et al. |
| 6,450,594 B1 | | 9/2002 | Ketting et al. |

(Continued)

*Primary Examiner*—Russell D Stomer
(74) *Attorney, Agent, or Firm*—Ronald W. Wangerow, Esq.; Harness, Dickey & Pierce, P.L.C.

(57) ABSTRACT

A unitized seal assembly is provided for installation between linkages of a chain drive designed for tracked vehicles. The seal assembly facilitates field preventative maintenance on the drive chain by utilizing an integral spacer that holds the critical sealing surfaces together at all times, and has a seal head that can be easily removed from the outer link bore of a chain link. Removal of the seal head from the outer link bore causes as-installed clearance passageways between the seal head and seat portions and the spacer to forcefully close and prevent abrasive particles from getting inside the seal and reaching the interior interface junction of the dynamic sealing surfaces during seal maintenance. The seal assembly also includes additional sealing features that provide improved performance.

20 Claims, 3 Drawing Sheets

U.S. PATENT DOCUMENTS

| | | | |
|---|---|---|---|
| 6,457,786 B1 * | 10/2002 | Maguire | 305/136 |
| 6,874,859 B1 | 4/2005 | Duse | |
| 6,962,340 B2 * | 11/2005 | Maruyama | 277/370 |
| 6,962,341 B2 | 11/2005 | Szam | |
| 2003/0214101 A1 * | 11/2003 | Yamamoto et al. | 277/562 |

* cited by examiner

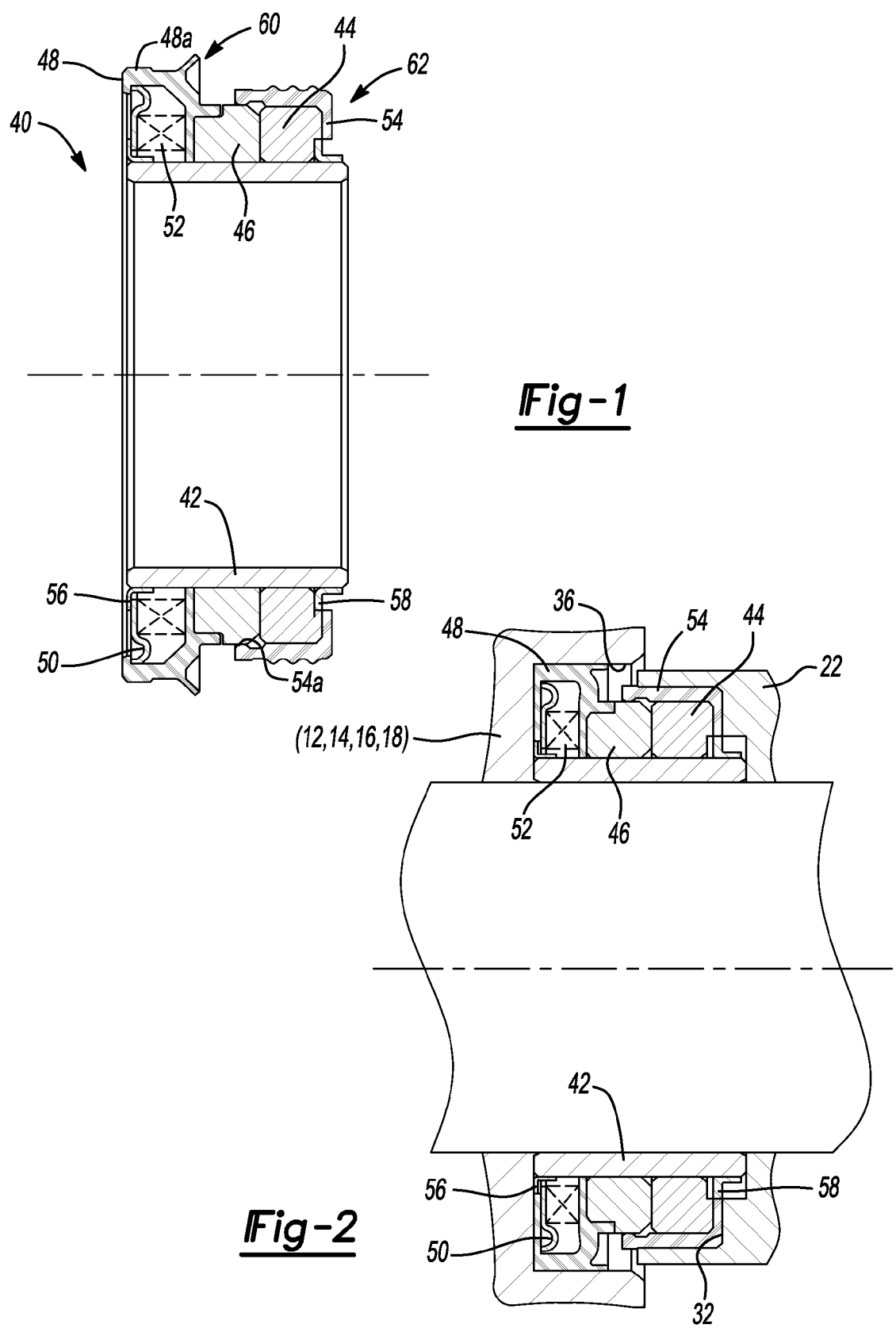

UNITIZED SEAL WITH INTEGRAL SPACER

CROSS-REFERENCE TO RELATED APPLICATIONS

This application is a divisional of U.S. patent application Ser. No. 11/142,875 filed on Jun. 1, 2005 (now abandoned). The entire disclosure of the above application is incorporated herein by reference.

FIELD OF THE INVENTION

The present invention relates to seal assemblies and more particularly to a seal assembly for use with chains used to drive a tracked vehicle.

BACKGROUND AND SUMMARY OF THE INVENTION

Drive chains are commonly used on vehicles having a track drive and typically include a chain bushing, a pin extending through the chain bushing and having an end projecting beyond the bushing and two chain links which are linked together by the pin and bushing on each side thereof. The chain links disposed on opposite sides of the chain bushing are overlapped in order to provide an inner chain link which is pressed onto the bushing and an outer chain link which is pressed onto the axially extending end of the pin.

Drive chains of this type are widely used in track vehicles such as construction vehicles, earth moving vehicles, and other special purpose vehicles. To reduce the friction, and thus reduce adhesive wear and minimize the overall wear, which can lead to chain lengthening and which can decrease the life of the chain or link assemblies, the hinge joints are lubricated with grease or oil containing additives which limit corrosion and increase the lubricant life. Track vehicles are typically operated and even have maintenance performed in very dirty environments in which there is a significant chance of contaminating dirt getting within the sealed environment. In particular, chain preventative maintenance typically consists of dismantling each and every link in the chain and rotating the bushings 180 degrees to distribute wear from the drive sprockets, which only wear against one half of the outer surface of the bushings at a time. With presently used seal designs, this assembly and re-assembly process inevitably contaminates the dynamic sealing surfaces of both the mechanical face seal head and the ends of the bushings that serve as the sealing counterface or seal seat for the seal. After field preventative maintenance is completed, the contamination trapped between the mechanical face seal head and the bushing seal seat surface can separate these sealing surfaces and/or cause their abrasive destruction. If the seals are destroyed, the seal's ability to retain lubricant internal of the seal and exclude external abrasives and liquids from entering the seal system and contaminating the lubricant is also destroyed. The loss or contamination of the oil that lubricates between the drive bushing and link pins, in turn causes wear and failure of these components, and the drive train.

Accordingly, it is an object of the present invention to provide a seal assembly that is capable of increasing the life of the sealing system and also facilitates field preventative maintenance in which the bushings are rotated. The system of the present invention provide a spacer sleeve that is disposed on the pin and provides a sealed relationship between the inner and outer links of a drive chain. A seal seat member is disposed on a first end of the spacer sleeve and a grommet member is disposed on the seal seat for engagement with a bore in the end of the bushing. A seal washer is disposed on the spacer sleeve adjacent to the seal seat member and a second seal member in the form of an elastomeric boot is seated on the seal washer. A spring seat is disposed on a second end of the spacer sleeve and supports a portion of the second seal member. A spring is disposed between the spring seat and the seal washer for biasing the spring seat and the attached portion of the second seal member against the mating bore portion of the outer link. The removal of the seal head portion, which is comprised of the elastomeric boot, spring seat, spring and seal washer from the outer link bore causes the as installed clearance passageways between the seal head and seat portions and the spacer to forcefully close and prevent abrasive particles from getting inside the seal and reaching the interior interface junction of the dynamic sealing surfaces. A radial lip seal portion of the seal seat extends and seals around the seal washer outer diameter to prevent abrasive particles from reaching the exterior interface junction of the dynamic sealing surfaces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross-sectional view of the unitized seal with integral spacer according to the principles of the present invention;

FIG. 2 is a cross-sectional view of the seal of FIG. 1 shown in an assembled configuration on a drive chain;

DETAILED DESCRIPTION OF THE PREFERRED EMBODIMENTS

The following description of the preferred embodiment(s) is merely exemplary in nature and is in no way intended to limit the invention, its application, or uses.

Figure 3:
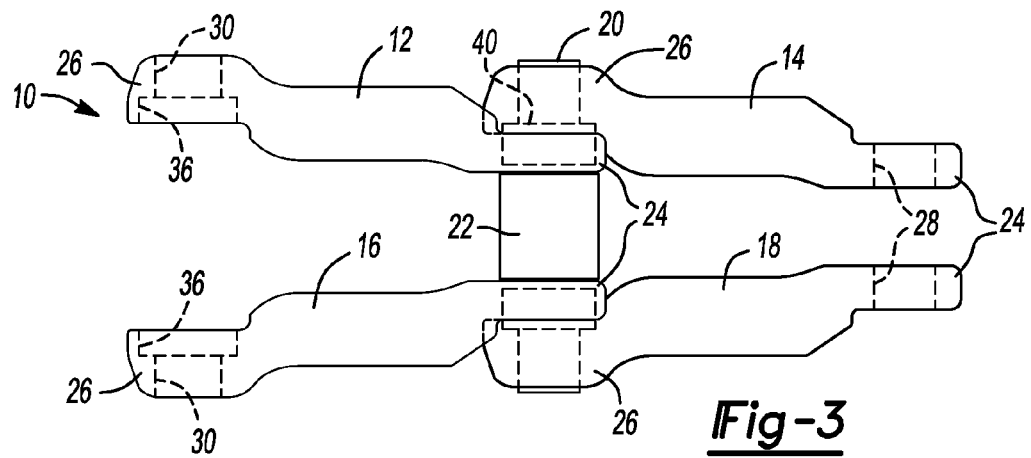
FIG. 3 is a top plan view of a drive chain section which incorporates the seal assembly according to the principles of the present invention.
Figure 4:
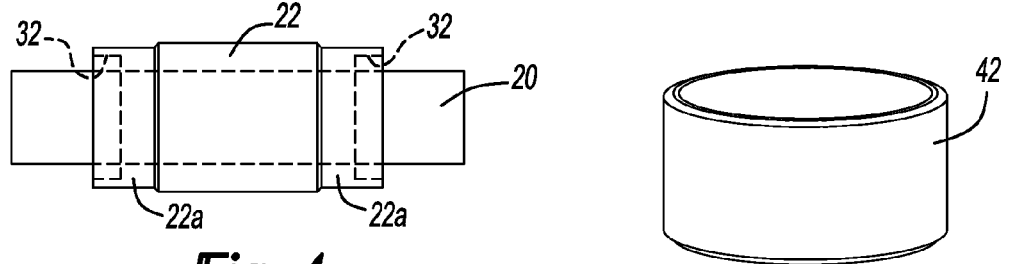
FIG. 4 is a plan view of a bushing and pin assembly of the chain drive according to the principles of the present invention.

With reference to FIG. 3, a drive chain 10 is shown including identical links 12, 14, 16, 18 each mounted to a pin 20 and bushing 22. Each link 12, 14, 16, 18 includes an inner end 24 and an outer end 26. The inner end 24 includes an aperture 28 extending therethrough and sized for receiving the end portion 22a of bushing 22. The outer end 26 includes an aperture 30 extending therethrough and sized for receiving the pin 20 therein. The bushing 22 is provided with a recessed bore portion 32 and the outer end 26 of links 12, 14, 16, 18 include a recessed bore portion 34 which combine with bore portion 32 to define a chamber portion therebetween for receiving seal assembly 40, according to the principles of the present invention.

With reference to FIGS. 1 and 2, the seal assembly 40, according to the principles of the present invention, will now be described. The seal assembly 40 includes a spacer sleeve 42 slidably received on the pin 20. A seal seat 44 is slidably mounted on a first end of the spacer sleeve 42. A seal washer 46 is disposed adjacent to the seal seat 44 and is also slidably mounted on the spacer sleeve 42. A first seal member in the form of a boot 48 is seated on the seal washer 46 and includes a forward portion thereof 48a supported by a spring seat 50. A wave spring 52 is disposed between the spring seat 50 and the seal washer 46. A second seal portion in the form of an elastomeric grommet 54 is disposed on the seal seat 44 and includes a lip seal portion 54a engaging the seal washer 46.

In the assembled configuration, the seal head portion 60 of the seal assembly 40, which is comprised of the boot 48, spring seat 50, wave spring 52 and seal washer 46 are received in the bore portion 36 of outer ends 26 of links 12, 14, 16, 18. The seal seat portion 62 of seal assembly 40, which is comprised of the seal seat member 44 and grommet 54 are received in the recessed bore portion 32 provided in the end of bushing 22. In the assembled condition, as shown in FIG. 2, the spring seat 50 is pressed axially inward away from end cap 56 and the seal seat 44 is pressed axially inward away from end cap 58 with the spacer sleeve 42 providing proper spacing between the outer end 26 of links 12, 14, 16, 18 and the end portion of bushing 22.

Figure 5:
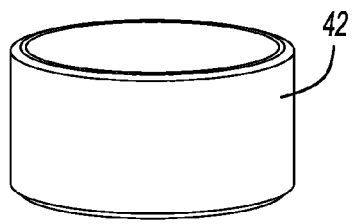
FIG. 5 is a perspective view of the spacer sleeve of the seal according to the principles of the present invention.

With reference to FIG. 5, the spacer sleeve 42 is shown and includes a cylindrical body. The spacer sleeve has a length equal to a desired spacing between the shoulder 66 within the bore 32 of bushing 22 and the bore 36 of the links 12, 14, 16, 18. The spacer sleeve 42 has an inner diameter sufficient to receive the pin 20 therein.

Figure 6:
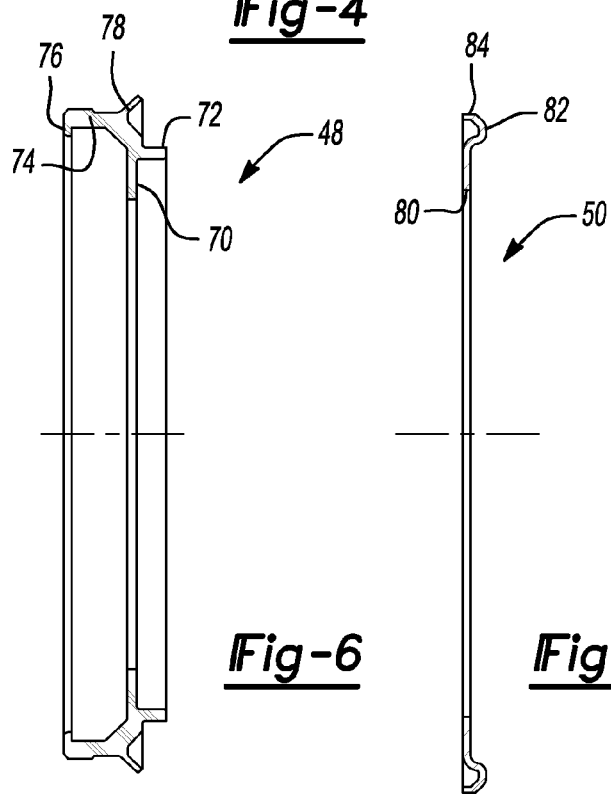
FIG. 6 is a cross-sectional view of a boot used in the seal according to the principles of the present invention.

With reference to FIG. 6, the boot 48 is shown including a radially inwardly extending flange portion 70 and axially extending flange portion 72 which are designed to seat against the seal washer 46. The boot 48 includes an arcuate body portion 74 extending from the radially inwardly extending flange portion 70 and axially extending flange portion 72. The arcuate-shaped body portion 74 terminates in a radially extending lip portion 76 which is engaged by the spring seat 50. A seal lip 78 extends radially from the arcuate body portion 74 intermediate the forward inwardly extending lip portion 76 and flange portions 70, 72.

Figure 7:
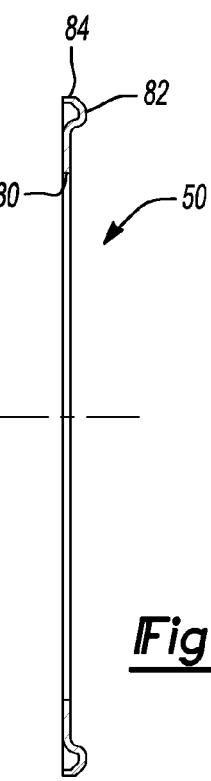
FIG. 7 is a cross-sectional view of a spring seat used in the seal according to the principles of the present invention.

With reference to FIG. 7, the spring seat 50 is shown and includes an annular steel disk having an opening 80 provided in the center thereof, and including an outer arcuate ring portion 82 having a terminal end 84 which engages the radially inwardly extending lip 76 of boot 48. The wave spring 52 engages the spring seat 50 radially inward of the arcuate shaped outer ring portion 82.

Figure 8:
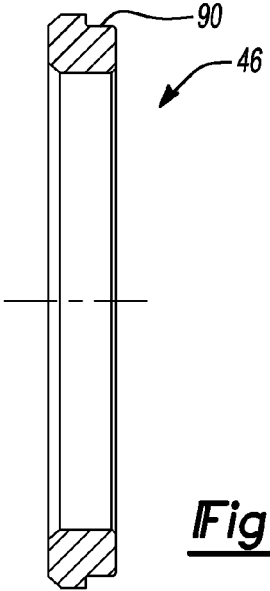
FIG. 8 is a cross-sectional view of the seal washer used in the seal in accordance with the principles of the present invention.

With reference to FIG. 8, the seal washer 46 is shown. The seal washer 46 includes an annular ring made of sintered bronze, although other materials may also be utilized. The seal washer 46 includes a recessed shoulder portion 90 adapted to receive the axially extending flange portion 72 of boot 48.

Figure 9:
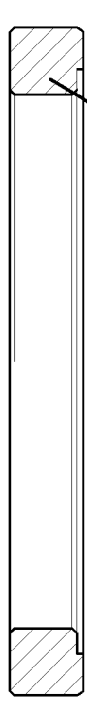
FIG. 9 is a cross-sectional view of a seal seat used in the seal in accordance with the principles of the present invention.

With reference to FIG. 9, the seal seat 44 is shown in the form of an annular ring preferably formed from hardened steel, although other materials may be utilized. The seal seat 44 is also preferably oil impregnated to provide enhanced lubrication properties. The seal seat 44 includes an inner recessed shoulder portion 92 which is adapted to receive the radially extending flange portion 58a of end cap 58.

Figure 10:
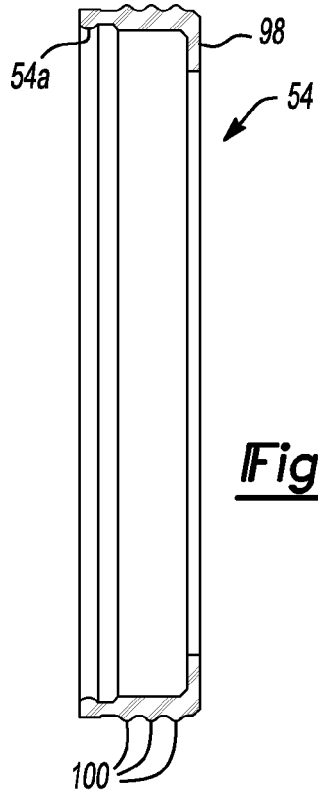
FIG. 10 is a cross-sectional view of a grommet utilized in the seal in accordance with the principles of the present invention.

With reference to FIG. 10, the grommet 54 is shown in the form of an annular ring made of an elastomeric material such as polyurethane, or other known seal materials. The grommet 54 includes a radially inwardly extending flange portion 98 which is adapted to engage an axial face of the seal seat 44. Grommet 54 includes sealing ribs 100 on an outer face thereof. Three sealing ribs 100 are shown, although more or fewer ribs can be utilized in accordance with the principles of the present invention. The grommet 54 includes a radially inwardly extending lip seal 54a which is adapted to engage seal washer 46.

Figure 11:
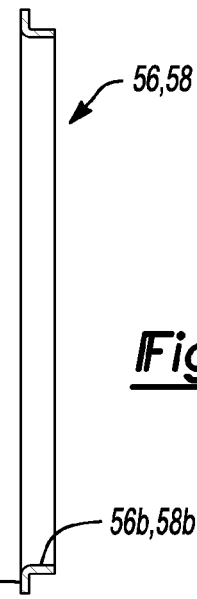
FIG. 11 is a cross-sectional view of an end cap used in accordance with the principles of the present invention.

With reference to FIG. 11, a cross-sectional view of the end caps 56, 58 is provided. The end caps 56, 58 each include an axially extending flange portion 56b, 58b and a radially extending flange portion 56a, 58a. The end caps 56, 58 are preferably made from steel and are press fit onto the spacer sleeve 42.

The unitized seal assemblies 40, according to the principles of the present invention, are installed seal seat portion (62) first into bores and counter-bores 32 of bushings 22, and are held firmly from rotating in the bore by the grommet's 54 triple sealing beads 100. The seal head portion 60 of unitized seal assembly 40 virtually install themselves into the outer link bores 36 when the links 12, 14, 16, 18 are pressed onto the pins 20.

The integral spacer sleeve 42 of unitized seal assembly 40 establishes the proper installed length of the seal 40 and opens internal running clearance inside the seal 40. Deflection of the boot 48 in the seal head portion 60 at installation, plus further deflection of the already pre-compressed wave spring 52 inside the assembly 40, provide long life axial seal preload. Inward compression of the boot's retaining lip 48a, axial boot portion 74, and spring forces clamping the boot tail against the bore bottom 36, plus biased expansion of the boot body section 74 into the bore diameter prevent the seal head portion 60 of the seal assembly 40 from rotating in the outer link bore 36. The stretch of the boot 48 around the seal washer 46, the biased compression of the boot around the seal washer 46 during installation, and the axial clamping of the boot inward radiating flange 70 against the rear of the seal washer 46 all prevent the seal washer 46 from rotating relative to the boot 48.

The seal seat portion 62 of the unitized seal assembly 40 features the grommet 54 having an integral extending lip seal 54a which stretches and seals around the outer diameter of the seal washer 46. This auxiliary lip seal 54a helps prevent abrasives exterior to the seal from reaching the exterior junction of the dynamic sealing surfaces of the seal.

During field preventative maintenance, when the link pin 20 is driven out of an outer link 12, 14, 16, 18, the boot 48 of the seal head portion 60 decompresses with the aid of the spring 52 easing removal of the seal head portion 60 from the outer link bore 36. At this time, the seal head portion 60 is held in the bore solely by the compression of the boot retaining lip 78. As soon as the link pin 20 is driven out of the outer link 12, 14, 16, 18, the unitized seal assembly 40 expands axially with the aid of the spring 52 until the spring seat 44 seats against the flanged end cap 58 on one end of the integral spacer sleeve 42, and the spring seat 50 abuts against the flanged end cap 56 on the other end of the spacer sleeve 42, thus, closing running clearance passageways and preventing abrasives exterior to the seal 40 from entering the assembly and reaching the interior junction of the dynamic sealing surfaces of the seal. By virtue of the unitized construction of the spacer sleeve 42 holding the dynamic sealing surfaces together at all times, plus an auxiliary lip 54a preventing abrasives from reaching the exterior junction of the sealing surfaces, plus the closing of running clearances the moment the seal is decompressed preventing abrasives from reaching the interior junction of the sealing surfaces, the seal assembly 40 of the present invention is uniquely capable of surviving field disassembly and reassembly of the drive chain linkage of tracked vehicles without abrasives finding their way into the critical dynamic sealing interface of the seal.

Figure 12:
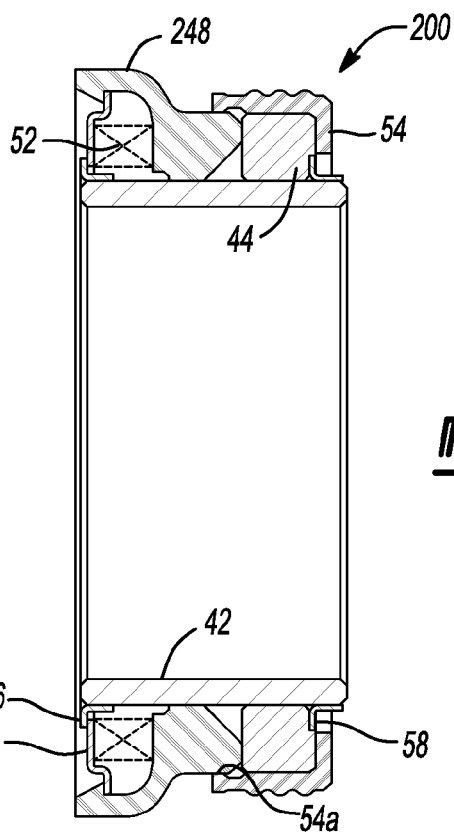
FIG. 12 is a cross-sectional view of a second embodiment of the seal assembly according to the principles of the present invention.

With reference to FIG. 12, a cross-sectional view of an alternative seal assembly, according to the principles of the present invention, are shown. In the alternative seal assembly 200, as shown in FIG. 12, the seal washer has been eliminated and the boot 248 is provided with an integrally formed annular base portion 248a. In this construction, the auxiliary sealing lip 54a of grommet 54 engages the base portion 248a of modified boot 248. The lip seal 78 of the boot 48 shown in FIG. 6 is also removed to assure easier removal of the sealing boot 248 from the outer link bore 36. Accordingly, with the embodiment of FIG. 12, the seal washer is formed integrally with the boot 48 and provides an exterior surface against which the auxiliary sealing lip 54a of grommet 54 is disposed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive chain assembly, comprising:
a first chain link;
a second chain link;
a pin engaged with said first and second chain links and coupling said first and second chain links to one another; and
a seal assembly including:
a spacer sleeve located on said pin;
a first seal member slidably disposed at a first end of said spacer sleeve and including an outer radial surface sealingly engaged with said first chain link;
a second seal member disposed at a second end of said spacer sleeve; and
a biasing member biasing said first seal member in an axial direction relative to said second seal member.

2. The drive chain assembly according to claim 1, wherein said first seal member includes an axially extending seal boot portion.

3. The drive chain assembly according to claim 2, wherein said second seal member includes a plurality of sealing ribs on an outer surface thereof.

4. The drive chain assembly according to claim 2, further comprising a spring seat engaging a portion of said seal boot portion, wherein said biasing member includes a spring disposed against said spring seat for biasing said spring seat relative to said second seal.

5. The drive chain assembly according to claim 1, wherein said second seal member is disposed on a seal seat member slidably mounted on said spacer sleeve.

6. The drive chain assembly according to claim 5, wherein said first seal member is mounted to a seal washer that is disposed adjacent to said seal seat member.

7. The drive chain assembly according to claim 6, wherein said second seal member includes a seal lip engaging said seal washer.

8. The drive chain assembly according to claim 1, wherein said second seal member is biased axially outward from said first seal member.

9. The drive chain assembly according to claim 8, a wherein said biasing member biases said second seal member axially outward from said first seal member, said biasing member displacing said second seal member axially outward from said first seal member when said seal assembly is removed from the drive chain.

10. The drive chain assembly according to claim 9, further comprising first and second end retaining members axially fixed on said spacer sleeve, axially spaced from one another and limiting outward axial travel of said first and second seal members relative to one another.

11. The drive chain assembly according to claim 10, wherein said first and second seal members are displaced axially inward relative to said first and second end retaining members and toward one another against an axial force provided by said biasing member when said seal assembly is installed in the drive chain.

12. A drive chain assembly, comprising:
a first chain link;
a second chain link;
a pin engaged with said first and second chain links and coupling said first and second chain links to one another; and
a seal assembly including:
a spacer sleeve located on said pin;
a seal seat member disposed on a first end of said spacer sleeve;
a first seal member disposed on said seal seat;
a seal washer disposed on said spacer sleeve adjacent said seal seat member;
a second seal member disposed on said seal washer;
a spring seat disposed on a second end of said spacer sleeve; and
a spring disposed between said spring seat and said seal washer.

13. The drive chain assembly according to claim 12, wherein a portion of said second seal member is an elastomeric boot member which has a portion thereof supported by said spring seat.

14. The drive chain assembly according to claim 13, wherein said elastomeric boot member includes a radially extending seal lip.

15. The drive chain assembly according to claim 12, further comprising a pair of end retaining members press fit on each end of said spacer sleeve.

16. The drive chain assembly according to claim 15, wherein said pair of end retaining members limit outward axial travel of said first and second seal members relative to one another.

17. The drive chain assembly according to claim 16, wherein said first and second seal members are displaced axially inward relative to said pair of end retaining members and toward one another against an axial force provided by said spring when said seal assembly is installed in the drive chain.

18. The drive chain assembly according to claim 12, wherein said first seal member further includes a sealing portion engaging said seal washer.

19. The drive chain assembly according to claim 18, wherein said sealing portion of said first seal member includes a lip seal.

20. The drive chain assembly according to claim 12, wherein said spring biases said second seal member axially outward relative to said first seal member.

* * * * *